United States Patent
Takeuchi

(12) 
(10) Patent No.: US 6,519,357 B2
(45) Date of Patent: *Feb. 11, 2003

(54) APPEARANCE INSPECTION MACHINE AND METHOD FOR CONCURRENTLY PERFORMING DEFECT DETECTION AND CLASSIFICATION

(75) Inventor: Naoya Takeuchi, Hachioji (JP)

(73) Assignee: Tokyo Seimitsu Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/392,285

(22) Filed: Sep. 9, 1999

(65) Prior Publication Data

US 2002/0181757 A1 Dec. 5, 2002

(30) Foreign Application Priority Data

Dec. 1, 1998 (JP) .......................... 10-341810

(51) Int. Cl.$^7$ ................................ G06K 9/00
(52) U.S. Cl. ........................ 382/149; 348/87
(58) Field of Search ................ 382/149, 144, 382/145, 141; 348/86, 87, 88, 91

(56) References Cited

U.S. PATENT DOCUMENTS

| | | | |
|---|---|---|---|
| 4,928,234 A | | 5/1990 | Kitamura et al. |
| 5,038,048 A | * | 8/1991 | Meada et al. ................ 250/563 |
| 5,572,598 A | * | 11/1996 | Wihl et al. ................... 382/144 |
| 5,982,920 A | * | 11/1999 | Tobin, Jr. et al. ........... 382/145 |
| 6,292,582 B1 | * | 9/2001 | Lin et al. ..................... 382/149 |
| 6,360,005 B1 | * | 3/2002 | Aloni et al. ................. 382/148 |

FOREIGN PATENT DOCUMENTS

| | | |
|---|---|---|
| JP | 5-338121 | 12/1993 |
| JP | 10-185535 | 7/1998 |
| WO | WO97/35337 | 9/1997 |

* cited by examiner

*Primary Examiner*—Yon J. Couso
(74) *Attorney, Agent, or Firm*—Christie, Parker & Hale, LLP

(57) ABSTRACT

Disclosed is an appearance inspection machine comprising an image acquisition unit, a defect information production unit, and an automatic defect classification unit. The defect information production unit detects a defect by comparing two image data and produces defect information. The automatic defect classification unit autonomously classifies a defect according to image data of a defective part concerned. The defect information production unit consists of a comparison buffer memory, an image comparison unit, an analysis buffer memory, and a sampling and control unit. Image data is temporarily stored in the comparison buffer memory. The image comparison unit detects a defect by comparing image data of one die with image data of other two dice. Image data is temporarily stored in the analysis buffer memory. The sampling and control unit selects an analysis-needed part according to defect information and transfers necessary image data to the automatic defect classification unit. As soon as defect information is produced, the sampling and control unit selects an analysis-needed part and transfers necessary image data. Thus, defect detection and classification are partly carried out concurrently.

18 Claims, 13 Drawing Sheets

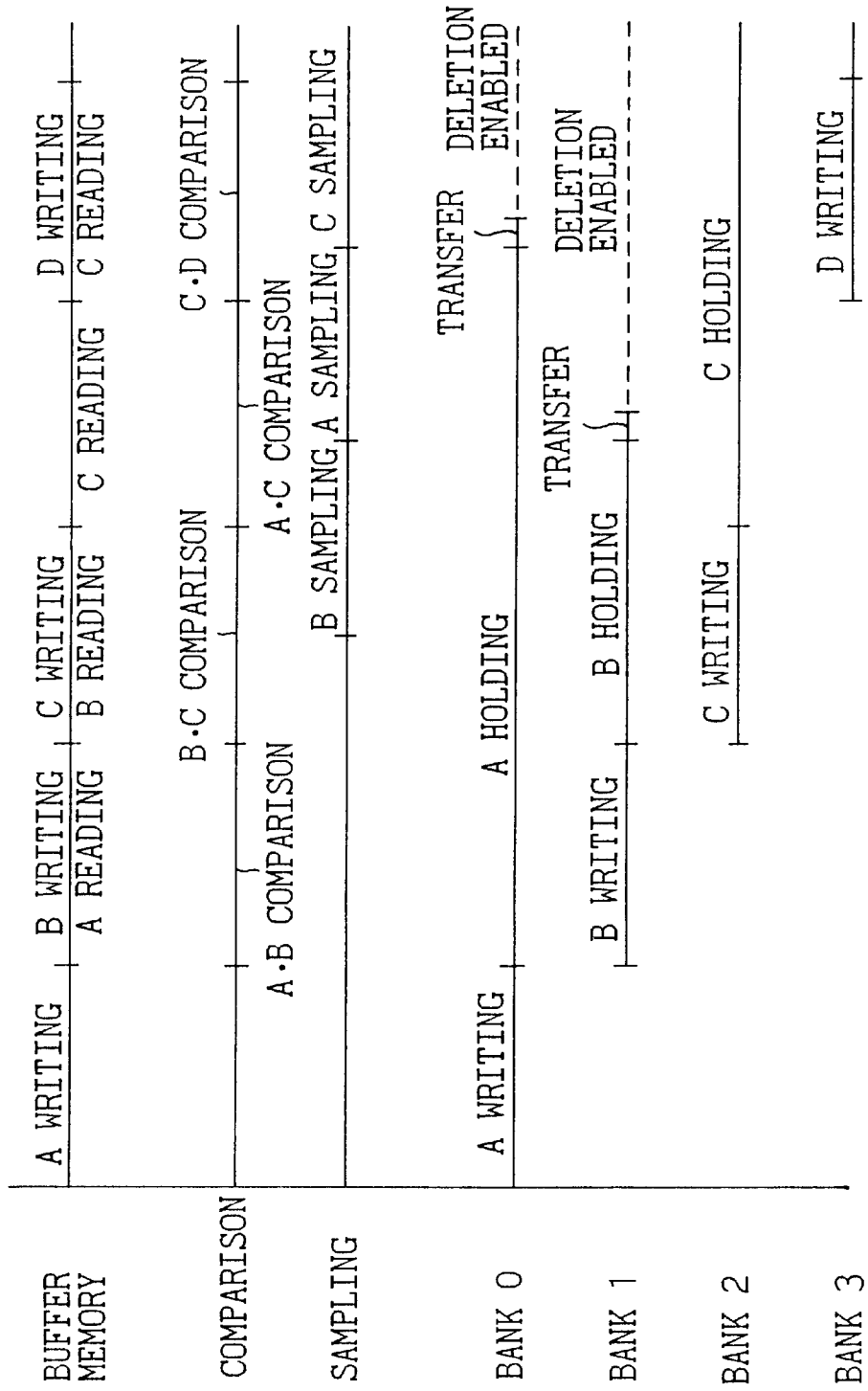

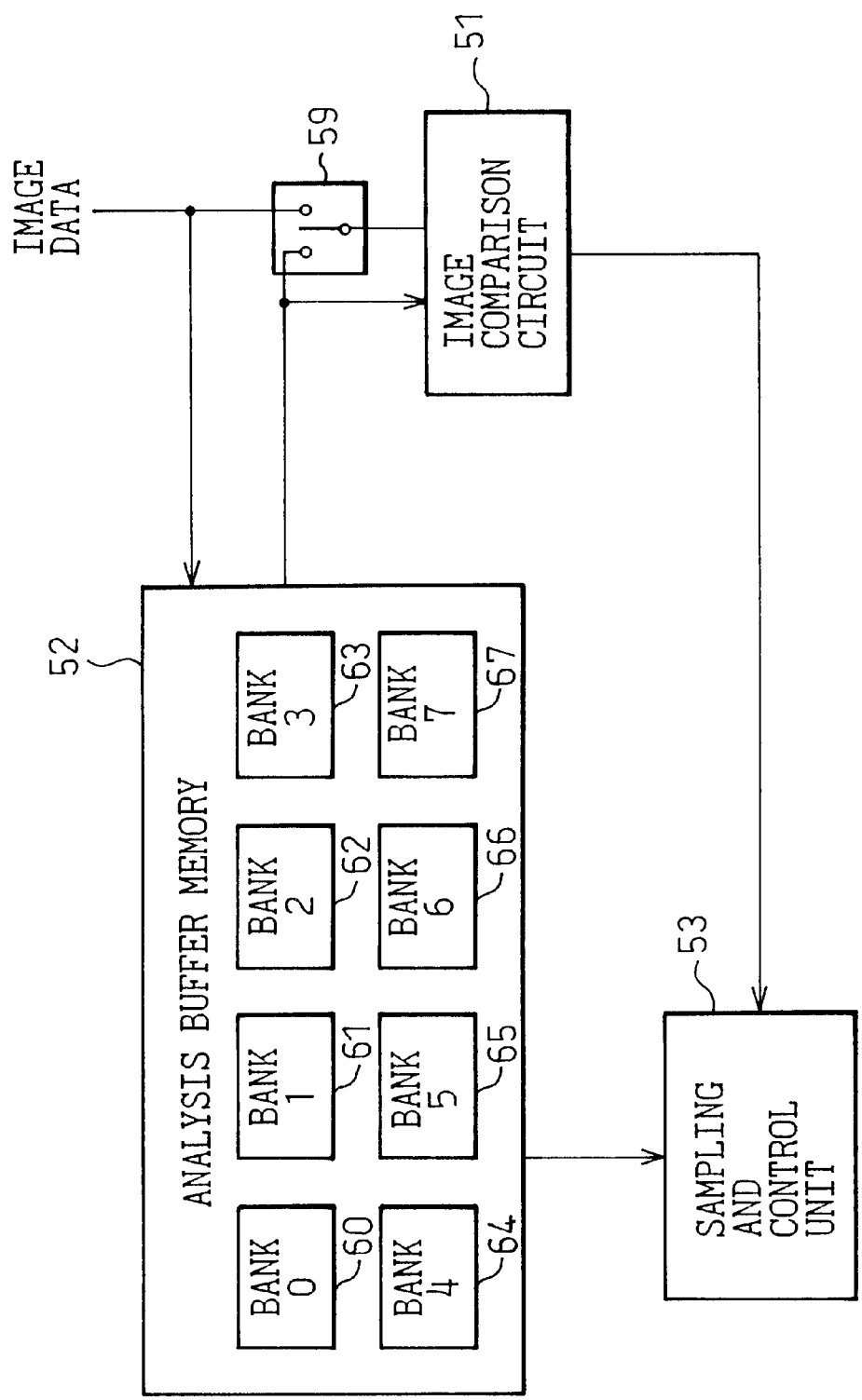

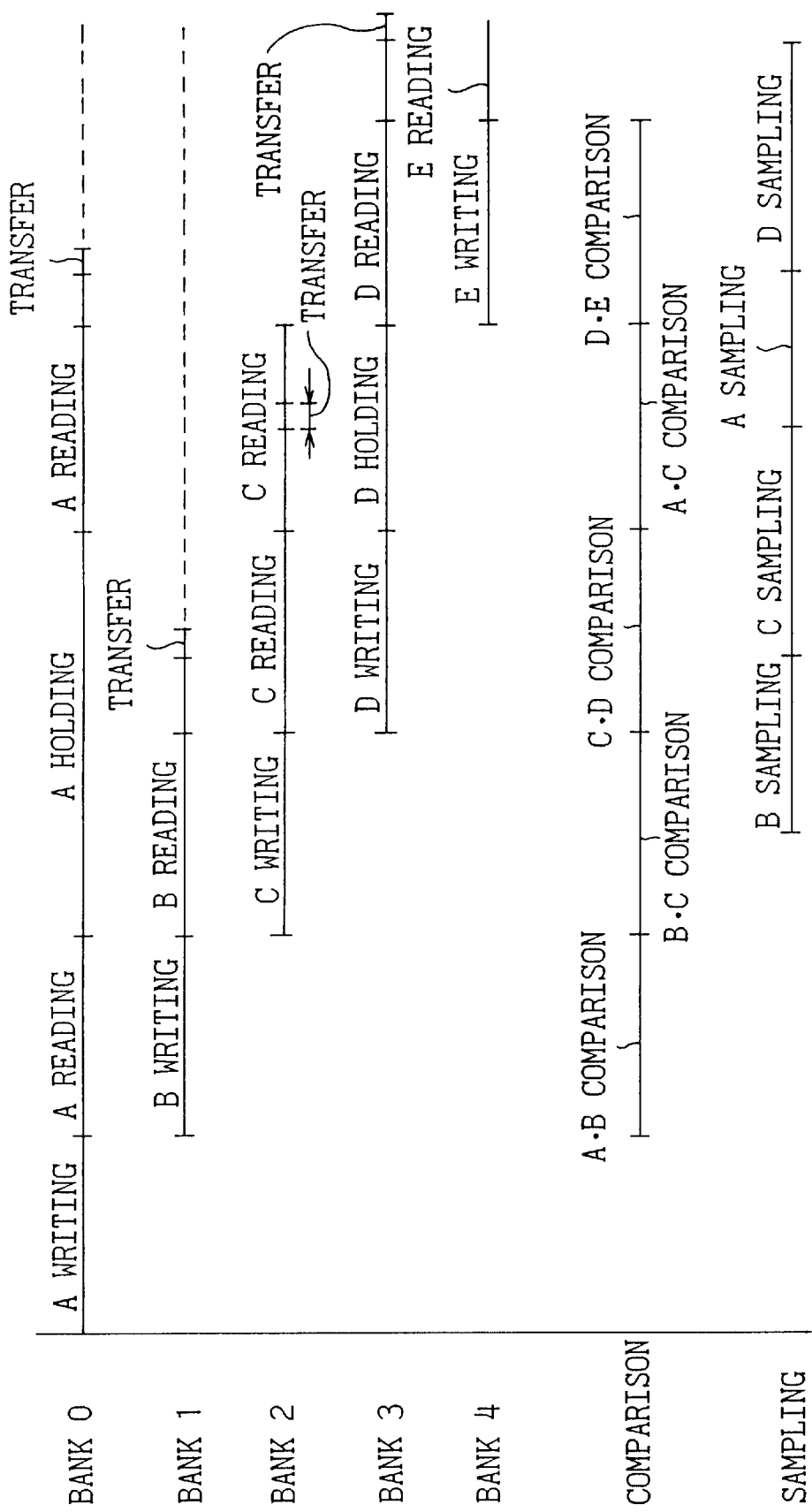

APPEARANCE INSPECTION MACHINE AND METHOD FOR CONCURRENTLY PERFORMING DEFECT DETECTION AND CLASSIFICATION

BACKGROUND OF THE INVENTION

1. Field of the Invention

The present invention relates to an appearance inspection machine and method for semiconductor wafers. More particularly, this invention is concerned with a technology for quickly inspecting the appearance of a semiconductor wafer as a whole.

2. Description of the Related Art

In general, a semiconductor wafer manufacturing process consists of about 300 to 500 steps. If a defect occurred at each step, an enormous number of defects would be found at the last step. This is because a defect occurring at one step is accumulated on defects having occurred previously. For improving the yield of a product, ideally, the appearance of the product is inspected at each step. However, this is unfeasible in terms of cost and labor. In reality, the appearance of the product is inspected at some steps. For further improving the manufacturing efficiency, appearance inspection should preferably be included in the manufacturing process. There is therefore a demand for high-precision appearance inspection that can be performed as quickly as the manufacturing process progresses.

In general, appearance inspection falls into defect detection and automatic defect classification (ADC). The defect detection is performed on a whole semiconductor wafer by an image processing unit. The automatic defect classification is performed by an automatic defect classification (ADC) system for automatically classifying a defect detected through the defect detection into a category. According to a prior art, after defect detection performed on a whole semiconductor wafer is completed, a stage is moved in order to pick up the image of a defective area. Image data of the defective area is then stored in the ADC system. Image data of a normal counterpart of an adjacent die is stored in the ADC system.

In a conventional appearance inspection machine, after defect detection is completed, a stage is moved in order to acquire image data of an analysis-needed part and normal part. The image data is processed for classifying a defect. The time required for processing is therefore equal to a sum of the time required for defect detection accompanied by scanning and the time required for acquisition and classification of analysis image data accompanied by movement of the stage.

As far as the conventional appearance inspection machine is concerned, the processing time is equal to the sum of the time required for detect detection and the time required for acquisition and classification of analysis image data. The processing time is therefore very long. The time that can be spent for inspecting the appearance of one semiconductor wafer is limited and must be further shortened.

For example, an image projected at a high magnification may be sampled by a TDI sensor. In this case, it takes 30 min to one hour to detect a defect on one semiconductor wafer. It is therefore required to acquire and classify analysis image data in 10 mins, or less. To reduce the processing time, the number of analysis-needed parts is decreased. This brings about the current situation that analysis cannot be carried out satisfactorily.

SUMMARY OF THE INVENTION

The present invention attempts to solve the foregoing problems. An object of the present invention is to provide an appearance inspection machine and method capable of classifying a defect automatically and efficiently and analyzing a defect for a short time. Specifically, the present invention is intended to shorten the processing time required for an entire appearance inspection and to improve the throughput of inspection.

To accomplish the object, in an appearance inspection machine and method in accordance with the present invention, an analysis buffer is included for temporarily storing acquired image data. As soon as defect information is produced according to the results of comparison, an analysis-needed defect is selected. Image data required for analyzing the analysis-needed part is transferred from the analysis buffer to an automatic defect classification unit. Thus, defect detection and classification are partly carried out concurrently.

An appearance inspection machine according to the present invention comprises an image acquisition unit, a defect information production unit, and an automatic defect classification unit. The image acquisition unit sequentially acquires image data of each die by scanning a semiconductor wafer having dice formed thereon. The defect information production unit compares acquired image data with image data of a counterpart of another die so as to detect a defect, and produces defect information sequentially. The automatic defect classification unit automatically classifies a defect according to the image date of at least part of the detected defect. The defect information production unit consists of a comparison buffer memory, an image comparison unit, an analysis buffer memory, and a sampling and control unit. Acquired image data is temporarily stored in the comparison buffer memory. The image comparison unit compares image data with a counterpart of image data stored in the comparison buffer memory. The sampling and control unit selects an analysis-needed part of which defect is classified automatically using the automatic defect classification unit according to sequentially-produced defect information. The sampling and control unit then transfers image data necessary to analyze the analysis-needed part to the automatic defect classification unit. As soon as defect information is produced, the sampling and control unit selects an analysis-needed part and transfers image data. The automatic defect classification unit sequentially classifies transferred image data. Thus, defect detection by the defect information production unit and classification by the automatic classification unit are partly carried out concurrently.

Moreover, an appearance inspection method in accordance with the present invention comprises an image acquisition step, a defect information production step, and an automatic defect classification step. At the image acquisition step, image data of each die is acquired sequentially by scanning a semiconductor wafer having a plurality of dice formed thereon. At the defect information production step, acquired image data is compared with a counterpart of another die in order to detect a defect, and defect information is produced sequentially. At the automatic defect classification step, a defect is classified automatically by checking the image data of at least part of the detected defect. The defect information production step comprises a comparison data storage step, an image comparison step, an analysis data storage step, an automatic defect classification step, and a sampling and control step. At the comparison data storage step, acquired image data is temporarily stored as comparison image data. At the image comparison step, image data is compared with a counterpart of the comparison image data in order to detect a defect. At the analysis data storage step, acquired image data is temporarily stored as analysis image data. At the sampling and control step, an analysis-needed part whose defect is automatically classified at the automatic defect classification step is selected based on the sequentially produced detect information. Image data necessary to analyze the analysis-needed part is transferred to an automatic defect classification memory. At the sampling and control step, as soon as detect information is produced, selection of an analysis-needed part and transfer of image data are carried out immediately. At the automatic defect classification step, a defect is classified based on transferred image data. Thus, defect detection at the defect information production step and classification at the automatic defect classification step are partly carried out concurrently.

According to the appearance inspection machine and method of the present invention, the analysis buffer memory is included for temporarily storing image data. It is judged whether the stored image data is necessary to analyze an analysis-needed part. If it is judged that the stored image data is necessary, the image data is preserved until it is transferred to a memory in the automatic defect classification memory. If it is judged that the stored image data is unnecessary, or that transfer is completed, the image data is released and the next image data is stored. The storage capacity of the analysis buffer memory may therefore be relatively small. According to these constituent features, defect detection and automatic defect classification are partly carried out concurrently. The time required for entire inspection will not be extended but the time required for automatic detect classification can be extended. This leads to satisfactory analysis. Moreover, it is unnecessary to acquire image of the analysis-needed part again. The inspection time can therefore be shortened accordingly. For example, according to the prior art, it takes 30 min to detect a defect, and it takes 10 min to acquire the image of an analysis-needed part and automatically classify the defect. In this case, the inspection time comes to 40 min. According to the present invention, automatic defect classification alone can be carried out over about 40 min that is the same as the above inspection time. Eventually, analysis can be achieved in more detail.

For detailed analysis, a level to be set for comparison in the image comparison unit is lowered in order to detect a larger number of defects. However, since selection of an analysis-needed part is carried out concurrently, analysis information that has been checked for selection is sequentially deleted. The storage capacity of a defect list memory need not be increased.

Conventionally, since the time required for automatically defect classification is insufficient, a significant defect is mainly analyzed. Image comparison is achieved by judging whether a difference between two image data items is larger than a set value. However, according to the present invention, automatic defect classification can be achieved accountely. During image comparison, information concerning the location and size of a defective part, the gray-scale level thereof, and a difference in gray-scale level thereof from a compared part can be output as defect information. An amount of image data to be checked for selecting an analysis-needed part, that is, for automatically classifying a defect is adjusted dynamically according to an amount of image data that can be checked for automatically classifying a defect within a certain time. For example, the occurrence frequency of a defect is low for some time since the start of inspection. The occurrence frequency may rise in the course of inspection. In this case, the criterion of selecting an analysis-needed part is lowered so that even a small defect will be selected as an analysis-needed part. In the course of inspection, the criterion of selection is raised so that the small defect will not be selected as an analysis-needed part. Consequently, an ADC system can be operated efficiently.

Image data to be transferred from an analysis buffer memory to an automatic defect classification unit includes image data of an image area covering an analysis-needed part, and its surroundings, which is required for automatic defect classification, and image data of a counterpart of an adjacent normal die. The size of the image area represented by image data to be transferred is varied depending on the size of the analysis-needed defect. Image data to be transferred is part of image data stored in the analysis buffer memory. The amount of image data is very small for that of the whole image data.

The storage capacity of the analysis buffer memory depends on the processing time required until an analysis-needed part is selected, and must be large enough to store image data acquired by scanning a row having the largest number of dice. In this case, the analysis buffer memory can be controlled easily.

Furthermore, image data read from at least part of the analysis buffer memory should be able to be supplied to the image comparison unit. This enables double detection to be performed on an edge die in the course of inspection.

Furthermore, image data read from the analysis buffer memory should be able to be supplied to the image comparison unit. In this case, the analysis buffer memory can be used as a comparison buffer. Another comparison buffer can be excluded.

The analysis buffer memory has a plurality of banks in each of which image data acquired by scanning one die once can be stored. The analysis buffer memory is structured so that data can be written in or read from the banks concurrently.

According to the prior art, the comparison buffer memory is included for temporarily storing image data. In the comparison buffer memory, when image data of the next die is acquired for comparison with stored image data, the image data of the next die is stored at the same time. When an analysis-needed part is detected, the image data has already been lost and cannot therefore be transferred to the automatic defect classification unit for use.

BRIEF DESCRIPTION OF THE DRAWINGS

The present invention will be more clearly understood from the description as set below with reference to the accompanying drawings, wherein:

FIG. 11 is a timing chart showing the relationship between processing and holding of image data by each unit in the configuration shown in FIG. 10;

FIG. 12 shows the configuration for using banks of an analysis buffer memory on behalf of a comparison buffer; and FIG. 13 is a timing chart showing the relationship between processing and holding of image data by each unit in the configuration shown in FIG. 12.

DESCRIPTION OF THE PREFERRED EMBODIMENTS

Before proceeding to a detailed description of the preferred embodiments, a prior art will be described with reference to the accompanying relating thereto for a clearer understanding of the differences between the prior art and the present invention.

Figure 1:
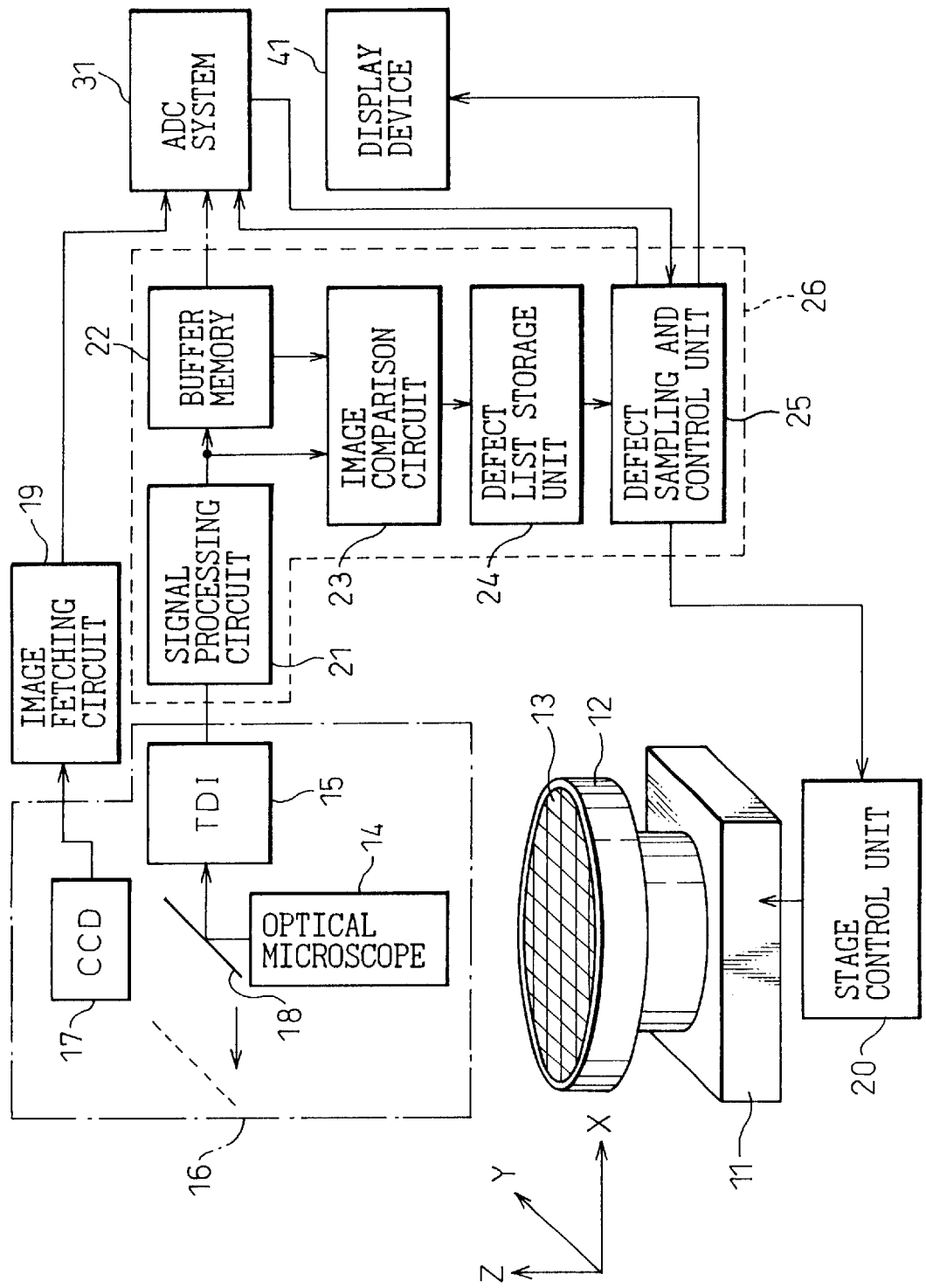
FIG. 1 shows an appearance inspection machine for semiconductor wafers according to a prior art.
Figure 2:
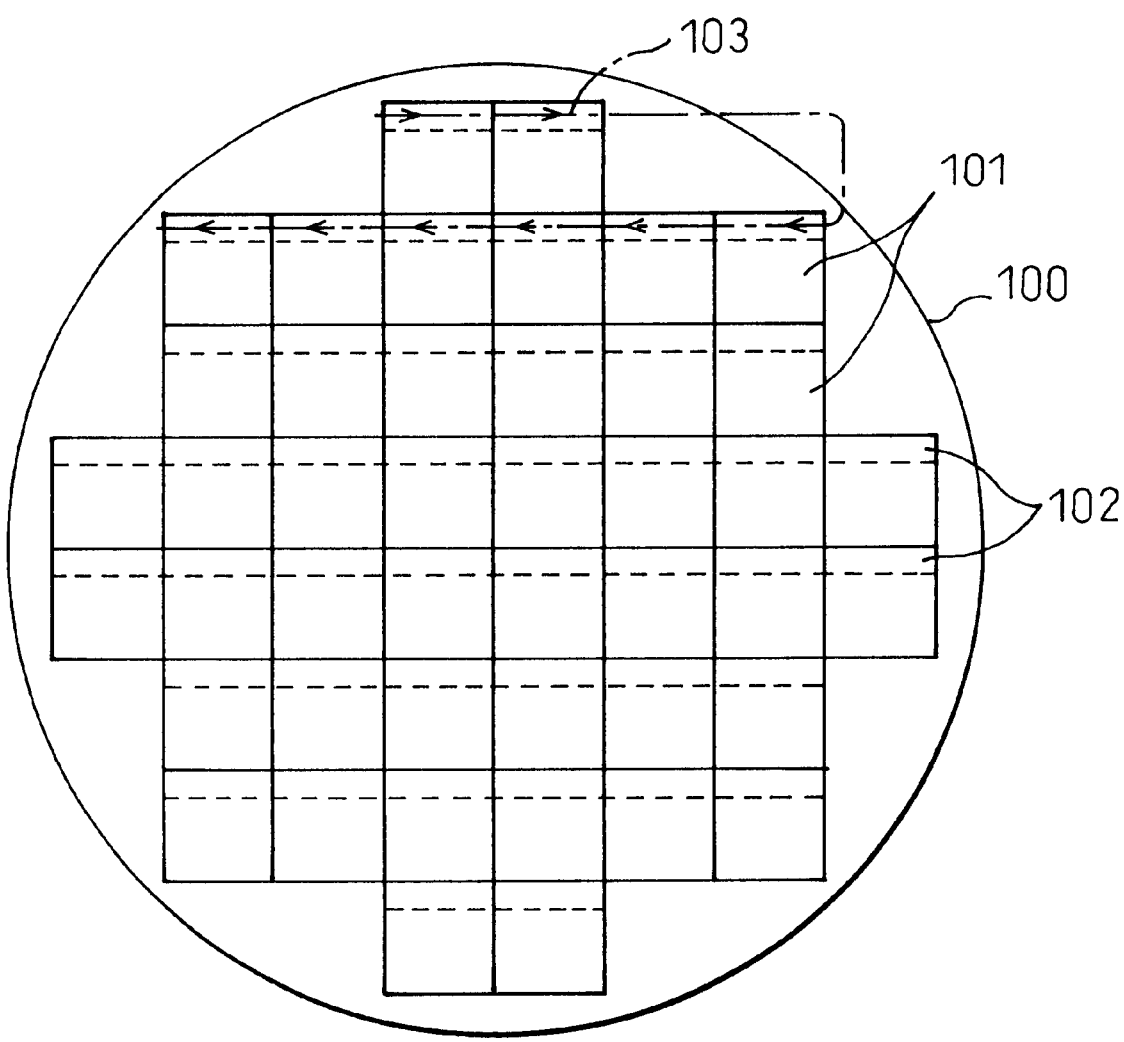
FIG. 2 shows a trajectory along which a semiconductor wafer is scanned using a linear sensor to be inspected for appearance.
Figure 3:
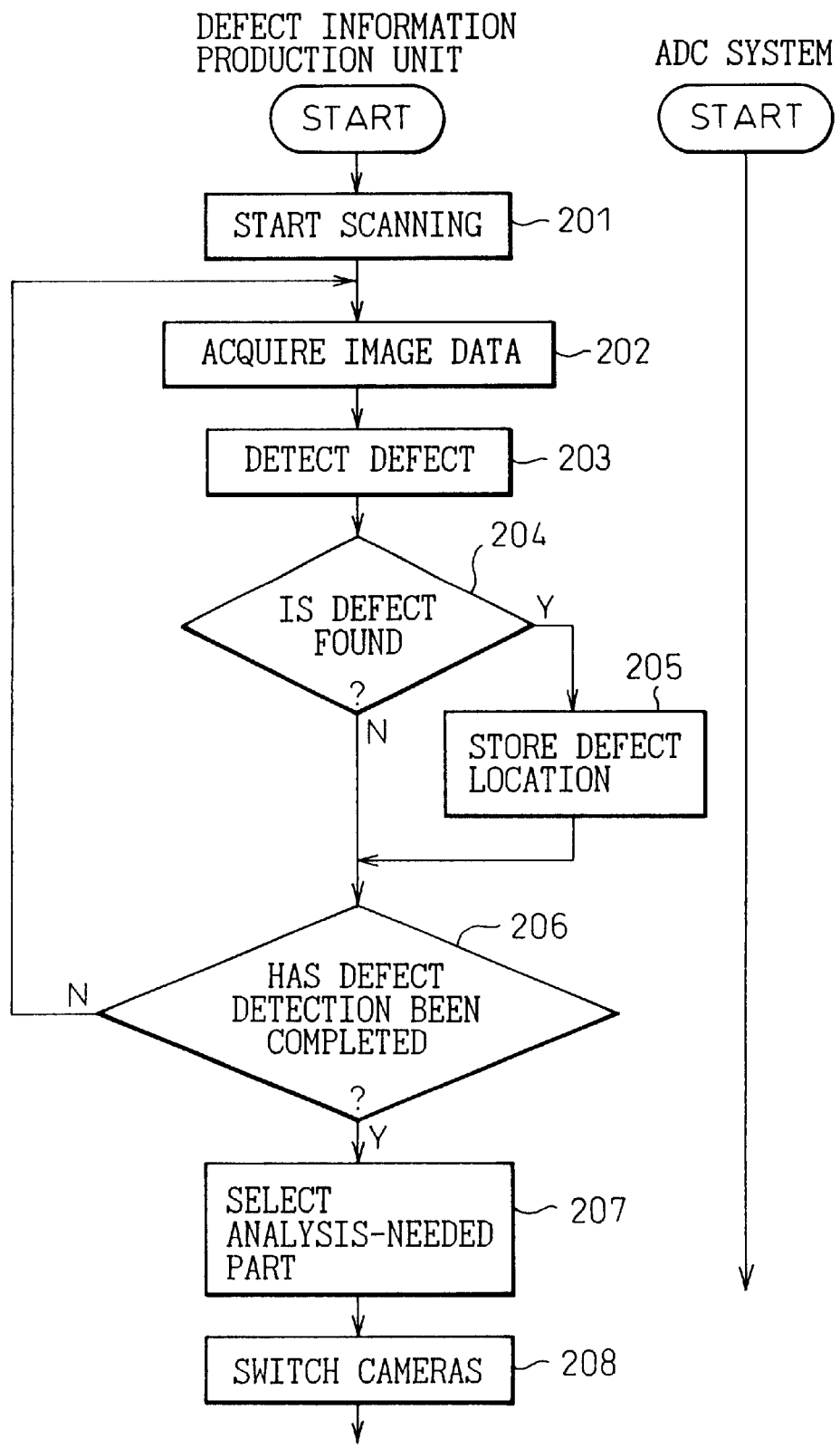
FIG. 3 is a flowchart describing defect detection to be performed in the appearance inspection machine of the prior art.
Figure 4:
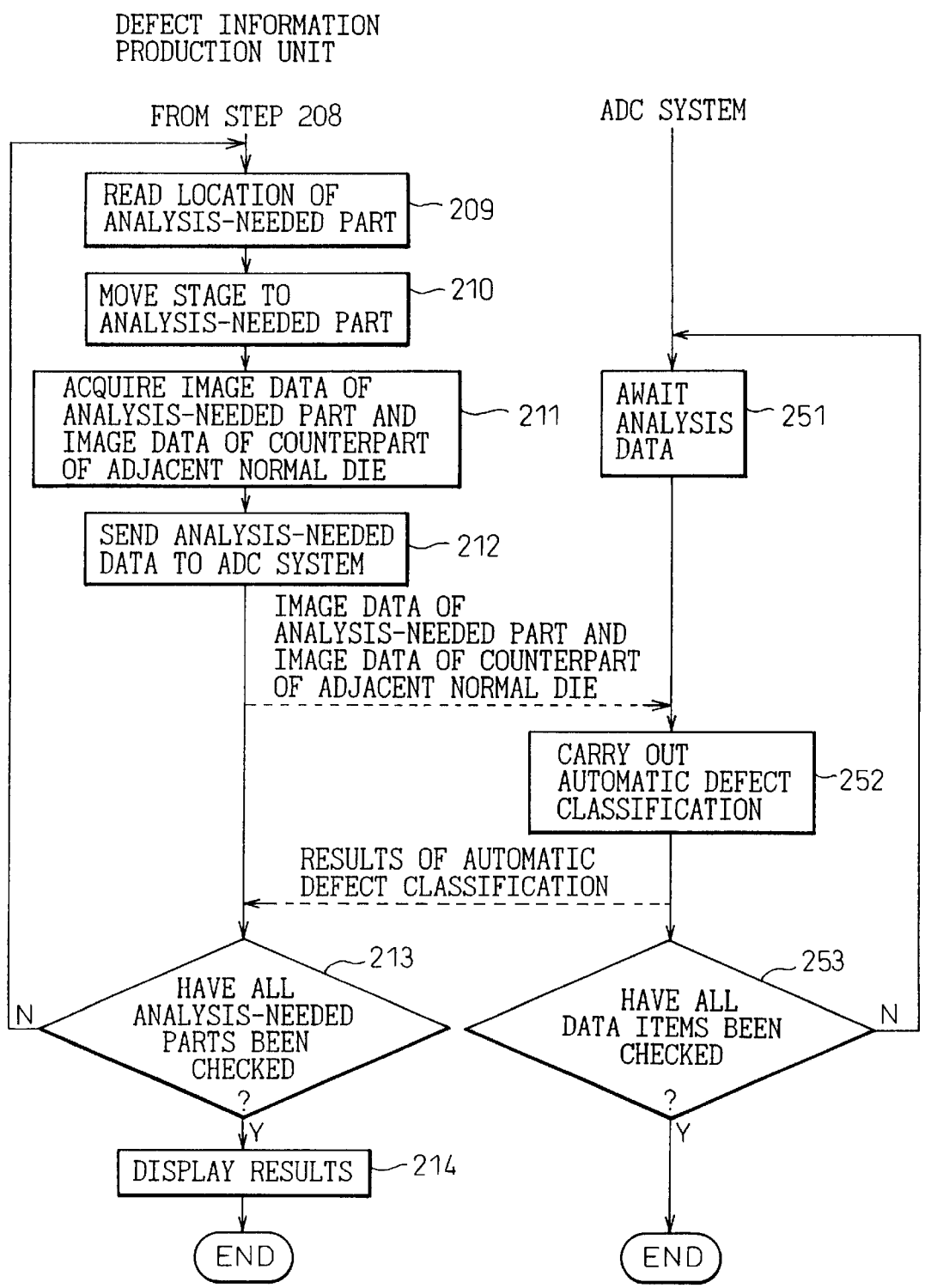
FIG. 4 is a flowchart describing automatic defect classification to be performed in the appearance inspection machine of the prior art.

FIG. 1 shows an appearance inspection machine for semiconductor wafers in accordance with a prior art. FIG. 2 shows a trajectory according to which a semiconductor wafer is scanned to acquire image data during inspection. FIG. 3 and FIG. 4 are flowcharts describing appearance inspection in accordance with the prior art.

As shown in FIG. 1, an appearance inspection machine of a prior art has a semiconductor wafer 13, which has a plurality of dice (chips) formed thereon, mounted on a sample holder 12 installed on a stage 11. The stage 11 has movements thereof controlled by a stage control unit 20. An optical microscope 14 magnifies and projects an image depicting the surface of the semiconductor wafer 13. In the prior art, either of a TDI sensor 15 and two-dimensional CCD 17 can be selected as an image pick-up device for picking up a projected image. When a reflecting mirror 18 is located on an optical path, the magnified surface image is projected on the TDI sensor 15. When the reflecting mirror 18 withdraws from the optical path, the image is projected on the CCD 17. Whichever is used as the image pick-up device is dependent on the purpose of use. A unit composed of the optical microscope 14, TDI sensor 15, CCD 17, and reflecting mirror 18 is referred to as an image acquisition unit 16. It is unnecessary to scan a semiconductor wafer with the CCD 17 for acquiring image data. The TDI sensor 15 that may also be used to align the semiconductor wafer 13 is realized by arranging line sensors in multiple stages. Signals produced by the line sensors are synthesized synchronously with scanning of a semiconductor wave performed by moving the stage. The TDI sensor thus offers improved sensitivity. A description will be made of an example of conventional appearance inspection machine in which the image acquisition unit 16 includes the TDI sensor. Alternatively, a line sensor may be substituted for the TDI sensor 15. Moreover, the CCD 17 may not be included.

An image signal produced by the TDI sensor 15 is sent to a defect information production unit 26. The defect information production unit 26 consists, generally, of a signal processing circuit 21, a buffer memory 22, an image comparison circuit 23, a defect list storage unit 24, and a defect sampling and control unit 25.

An acquired image signal is translated into multiple values by the signal processing circuit 21 and output as image data. The image data is sent to the comparison buffer memory 22, in which image data is temporarily stored for comparing adjacent dies, and to the image comparison circuit 23.

The image comparison circuit 23 compares image data sent from the signal processing circuit 21 with image data that is delayed because it has temporarily been stored in the comparison buffer memory 22. A defect is thus detected. The storage capacity of the comparison buffer memory 22 should be large enough to store only image data acquired by scanning one die once. A generally adopted technique of detecting a defect is double detection. A procedure of detecting a defect through double detection is such that patterns drawn on two or more adjacent dice are compared mutually in order to detect a defect. The procedure will be briefed with reference to FIG. 2.

For detecting a defect using a line sensor or TDI sensor, a semiconductor wafer is scanned as shown in FIG. 2. A plurality of dice (chips) 101 is formed on a semiconductor wafer 100. Each die is segmented into a plurality of band-like areas 102 in order to attain a desired resolution. The stage 11 is moved so that the image acquisition unit 16 will move relatively along a trajectory 103 on the semiconductor wafer 100. Image data items of corresponding parts of adjacent dice are compared with each other. For example, image data of a first die and image data of a second die, which are stored in the comparison buffer memory 22, are arithmetically aligned with each other in units of one pixel or smaller. Corresponding pixels are compared with each other in terms of a gray-scale level. The dice constituting the semiconductor wafer 100 have the same pattern. If corresponding pixels have a difference in gray-scale level exceeding a predetermined reference value, either of the first and second dice is presumably defective. A pixel location at which a defect is presumably present is stored in a memory. The technique of detecting a part, which is presumably defective, through one comparison is referred to as single detection. At the step of single detection, it is uncertain which of the dice is defective.

When image data of a third die is acquired, corresponding pixels of image data depicting the second and third dice are compared with each in terms of a gray-scale level. If a difference in gray-scale level between the corresponding pixels exceeds the predetermined reference value, either of the second and third dice is presumably defective. The pixel location is then stored in a memory. If the pixel locations found to contain a defect through two comparisons are the same with each other, it is judged that the pixel location in the second die contains a defect. After single detection is carried out twice, if the same pixel location is presumed to contain a defect, it is judged that a defect is present at the pixel location. This technique is referred to as double detection.

Pixel locations judged to contain a defect according to the foregoing procedure of detecting a defect through double detection are stored successively in the defect list storage unit 24. After the TDI sensor 15 whose width equals to a length scanned once is used to scan sideways all dice constituting a wafer one by one, one area whose image data has been acquired is checked to detect a defect. Thereafter, the defect sampling and control unit 25 selects an analysis-needed part, of which defect should be automatically classified by the ADC system 31, from defect information stored in the defect list storage unit 24. The selection is carried out because automatic defect classification requires much time. Image data used to classify a defect automatically by means of the ADC system 31 can be selected from image data acquired by the TDI sensor 15 and image data acquired by the CCD 17. For fetching the image data acquired by the TDI sensor 15 into the ADC system 31, the analysis-needed part is scanned, and acquired data is stored temporarily in the comparison buffer memory 22. Image data depicting the surroundings of the analysis-needed part is transferred to the analysis memory in the ADC system 31. A range of the image data to be transferred is determined according to the size of the analysis-needed part. At this time, image data of a counterpart of an adjacent die, which is judged to be normal, is stored in the analysis memory in the ADC system 31. The image data of the analysis-needed part is compared with the image data of the counterpart, and then automatic defect classification is carried out. For fetching the image data acquired by the CCD 17 into the ADC system 31, the reflecting mirror 18 is withdrawn from the optical path. The image data of the analysis-needed part is stored in the analysis memory in the ADC system 31 via an image fetching circuit 19. When the CCD 17 is employed, scanning is unnecessary. When the storage capacity of the analysis memory is equal to or larger than that of the comparison buffer memory 22, image data of the analysis-needed parts of a plurality of dice and image data of normal parts thereof can be stored in the analysis memory.

The ADC system 31 classifies a defect according to the image data of an analysis-needed part and normal part, and stores defect data. The classification is achieved by extracting the characteristics of the image data items of the analysis-needed part and normal part and referencing an information database that has been creased using actual defects in advance. Categories to which defects are classified vary depending on at which step of a manufacturing process appearance inspection is carried out. For example, one of the categories stipulates that foreign matter of particles is observed. Another category stipulates a short-circuited line. Still another category stipulates a disconnected (opened) line. Still another category stipulates a scratch. Still another category stipulates that the surface is grained. This defect is observed in a wafer having metallic lines patterned. Still another category stipulates that a resist remains intact (a residue). Still another category stipulates that no wiring hole is bored in a patterned wafer (openings for contacts are not created).

The foregoing procedure is repeated until all of selected analysis-needed parts are classified. The results of inspection are sent to the defect sampling and control unit 25, and then displayed by a display device 41. The results of inspection may be displayed successively during classification or may be output separately after the completion of classification. Moreover, classified defects may be statistically expressed for better analysis of a trend of defects. A magnification at which the image acquisition unit projects an image may be raised for acquiring more accurate image data of a defective part.

FIG. 3 and FIG. 4 are flowcharts describing defect detection and automatic defect classification which are performed in the appearance inspection machine for semiconductor wafers in accordance with the prior art.

At step 201, scanning is started for detecting a defect. At step 202, the image acquisition unit 16 acquires image data. At step 203, images are compared with each other by the image comparison circuit 23 in order to detect a defect. If it is judged at step 204 that a defect is found, the defective location is stored in the defect list storage unit 24 at step 205. Control is then passed to step 206. If no defect is found, control is passed to step 206. At step 206, it is judged whether all dice have been checked to detect a defect. The foregoing procedure is repeated until all the dice are checked to detect a defect.

When all the dice have been checked to detect a defect, the defect sampling and control unit 25 selects an analysis-needed part by checking the size of a defect specified in information of the defect locations stored in the defect list storage unit 24 at step 207. Analysis-needed parts selected are listed. When images picked up by the CCD 17 are used for analysis, cameras are switched at step 208. The locations of an analysis-needed part selected by the defect sampling and control unit 25 is retrieved from the list at step 209. At step 210, the stage is moved in order to acquire image data of the analysis-needed part and image data of a counterpart of an adjacent normal die (an image fetching circuit 19 or comparison buffer memory 22). At step 212, the image data items are sent to the analysis memory in the ADC system 31. Accordingly, the ADC system 31 passes control from step 251 at which analysis data is awaited to step 252 at which a defect is classified automatically. The results of classification are sent to the defect sampling and control unit 25. The steps 209 to 212, 251, and 252 are repeated until classification of all the analysis-needed parts is completed. When classification of the analysis-needed parts is completed, the ADC system 31 halts. The defect sampling and control unit 25 displays the locations of the analysis-needed parts and the results of classification at step 214. The procedure is then terminated. At steps 209 to 212, 251, and 252, if the storage capacity of the analysis memory in the ADC system 31 is sufficient, image data of the analysis-needed part and image data of a counterpart of an adjacent normal die are successively acquired and sent to the ADC system 31. At this time, the image data items are acquired and sent irrespective of the progress of classification by the ADC system 31. The ADC system 31 stores the sent image data in the analysis memory and carries out classification concurrently.

Figure 5:
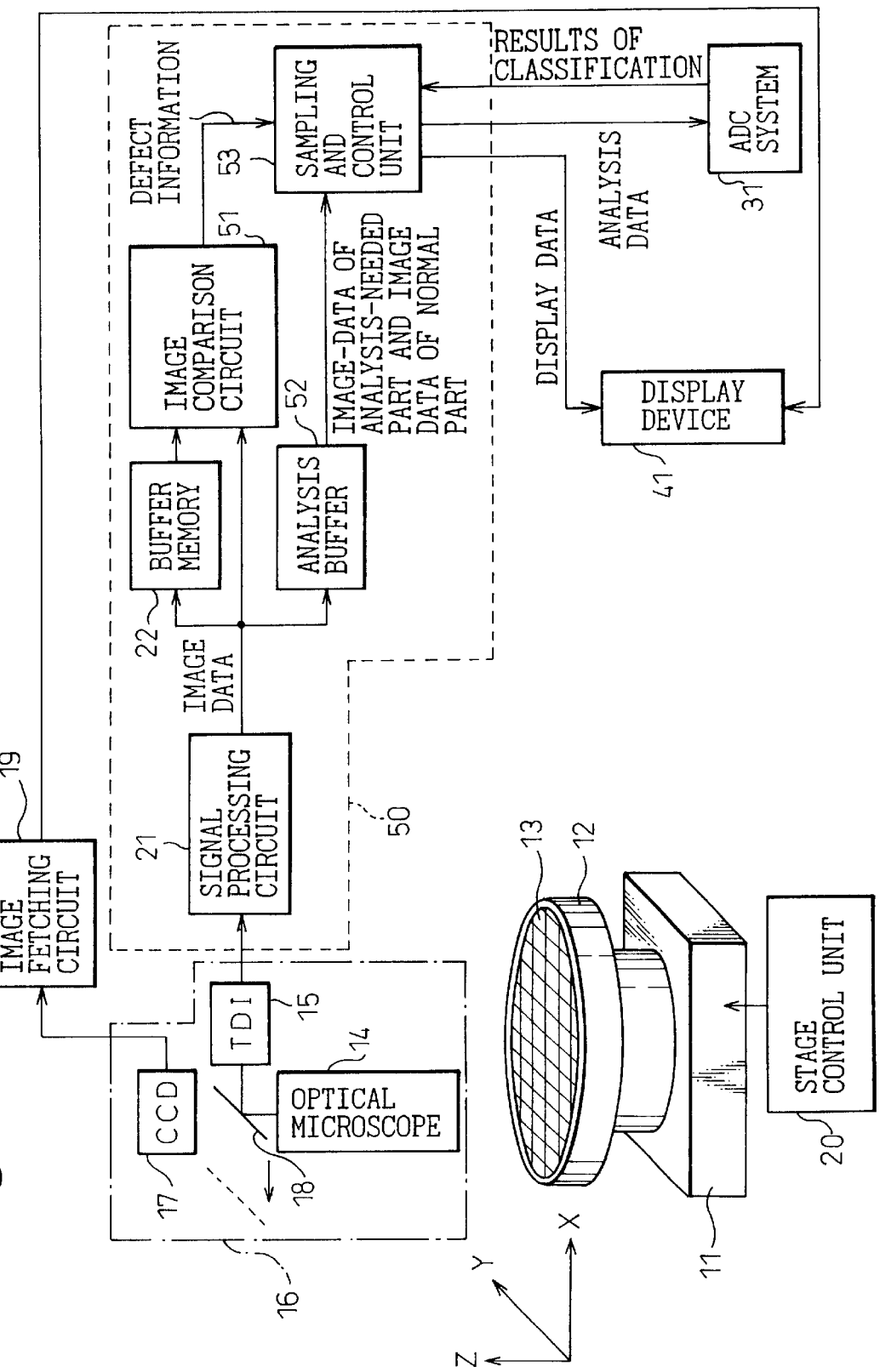
FIG. 5 shows the configuration of an appearance inspection machine in accordance with an embodiment of the present invention.

FIG. 5 shows the configuration of an appearance inspection machine in accordance with an embodiment of the present invention. As illustrated, an analysis buffer memory 52 having the configuration analogous to that in the prior art shown in FIG. 1 is included for temporarily storing image data. A stage 11, a sample holder 12, a semiconductor wafer 13, and a stage control unit 20 are identical to those in the prior art. Moreover, an optical microscope 14 and TDI sensor 15 are identical to those in the prior art. According to this embodiment, a CCD 17 and an associated reflecting mirror 18 and image fetching circuit 19 are included for aligning a semiconductor wafer and observing a defect. However, according to this embodiment, an ADC system 31 classifies defects automatically, and uses image data acquired by the TDI sensor 15. A defect information production unit 50 consists of a signal processing circuit 21, a comparison buffer memory 22, an image comparison circuit 51, an analysis buffer memory 52, and a sampling and control unit 53. In this embodiment, the components other than the ADC system 31 and a display 41 are installed in a clean room. The ADC system 31 and the display 41 are installed outside the clean room. The defect information production unit 50 and ADC system 31 are connected over a communication cable composed of optical fibers capable of transferring data quickly. Alternatively, all the components may be installed mutually adjacently. A difference from the prior art will be described below.

The image comparison circuit 51 compares image data with image data of an adjacent die output from the comparison buffer memory 21. The image comparison circuit 51 judges whether a difference between the image data items is equal to or larger than a set value, and outputs the results of comparison as defect information. This is identical to the action of the image comparison circuit in the prior art. In addition, the image comparison circuit 51 of this embodiment outputs a difference in gray-scale level between the current image data and previous image data as defect information. The image comparison circuit 51 is realized entirely with hardware.

The analysis buffer memory 52 will be described later. The analysis buffer memory 52 has at least four banks. Each bank offers the same storage capacity as that of the comparison buffer memory 21. For inspecting, for example, the semiconductor wafer 13 shown in FIG. 2, the analysis buffer memory 52 has eight banks or the largest number of dice arranged in one row. Data can be written in or read from the banks mutually independently and concurrently.

The sampling and control unit 53 uses defect information output from the image comparison circuit 51 to select (or sample) an analysis-needed part whose defect will be automatically classified. Image data of the analysis-needed part and its surroundings which is needed for analysis is transferred together with image data of a counterpart of an adjacent die, which is judged to be normal, to the analysis memory in the ADC system 31. A range of image data to be transferred is determined according to the size of an analysis-needed part. The sampling and control unit 53 is realized with a stand-alone computer, and the actions thereof are executed according to software.

The sampling and control unit 53 judges the category of a defect according to defect information and samples an analysis-needed part. The categories or frequencies of defects differ with a semiconductor wafer to be inspected. The criterion for sampling should preferably be varied depending on defect information and the processing capability of the ADC system 31. For example, when occurrence of a category are rare, the criterion for sampling is lowered in order to sample even minor defects belonging to the category. When occurrence of a category is frequent, the criterion for sampling is raised so as not to sample minor defects belonging to the category. It is thus prevented that the processing performed by the ADC system 31 is delayed. As mentioned above, a difference in gray-scale level between a defective part and an adjacent counterpart is included in defect information in addition to the location of the defect. The dynamic sampling is therefore enabled.

The ADC system 31 automatically classifies a defect according to image data transferred to the analysis memory. The ADC system 31 is installed in an independent computer. The categories into which defects are classified vary depending on at which step of a manufacturing process the defect inspection machine of the present invention is adapted. For example, as mentioned above, the categories stipulate particles, a short-circuited line, an opened line, a scratch, grains, a residue, and no contact opening.

When the image comparison circuit 51 starts outputting defect information, the sampling and control unit 53 sequentially samples image data that is necessary to analyze an analysis-needed part. The sampling and control unit 53 then transfers it from the analysis buffer memory 52 to the analysis memory in the ADC system 31. As soon as the ADC system 31 receives the image data, it classifies a defect. When three or more dice have been checked to detect a defect, image data is transferred sequentially to the ADC system 31 concurrently with classification of a defect. This means that defect detection and defect classification are carried out concurrently.

Figure 6:
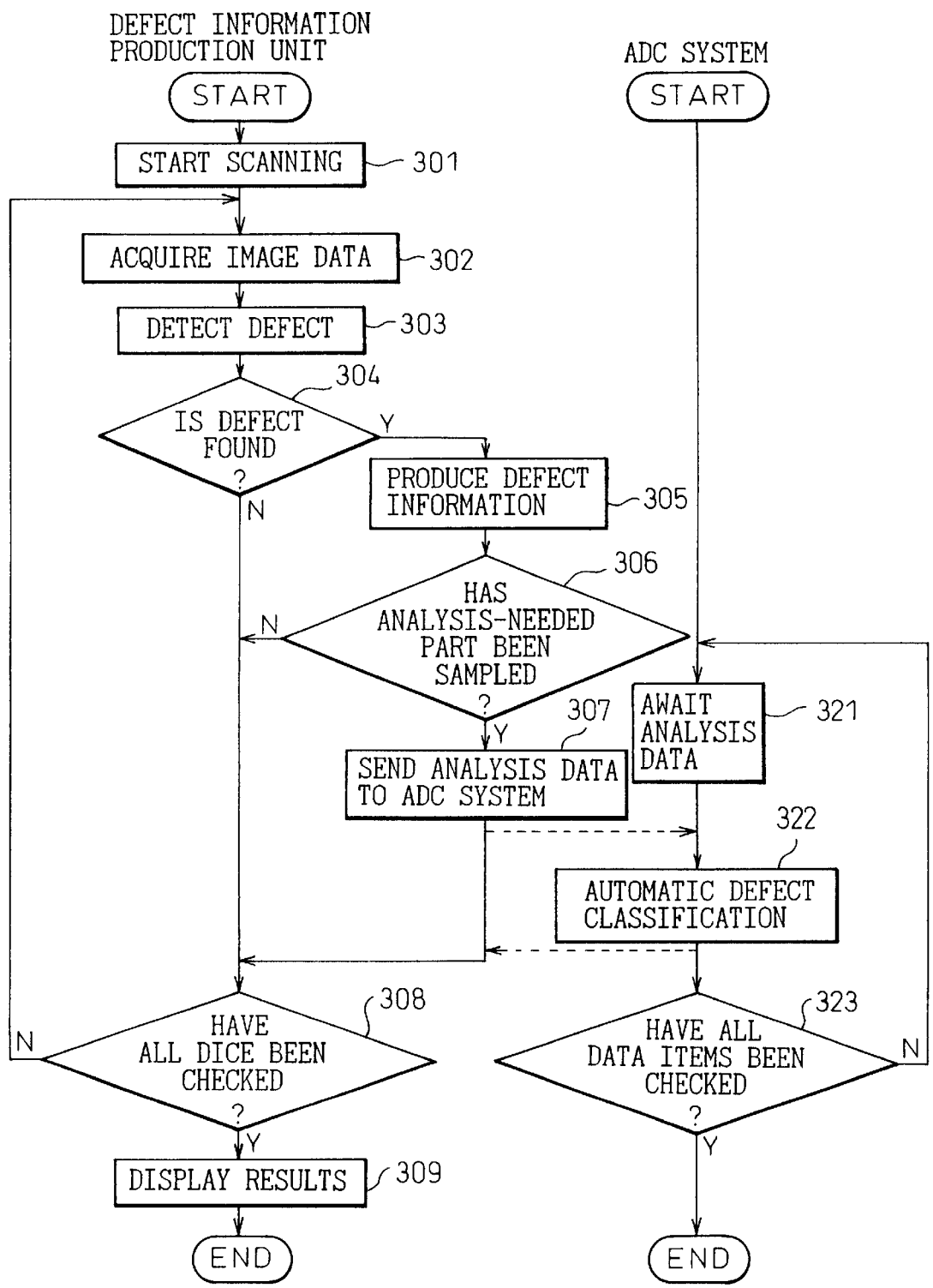
FIG. 6 is a flowchart describing defect detection and automatic defect classification to be performed according to the embodiment of the present invention.

FIG. 6 is a flowchart describing defect detection and automatic defect classification to be carried out in accordance with this embodiment.

At step 301, scanning is started for detecting a defect. At step 302, image data is acquired by the image acquisition unit 16. At step 303, the image comparison circuit 51 compares one image with another so as to detect a defect. If no defect is detected, control is passed to step 308. If a defect is detected, defect information is produced at step 305. Accordingly, the sampling and control unit 53 judges from the defect information whether the defect is considered as an analysis-needed part (samples an analysis-needed part). If the defect is not considered as an analysis-needed part, control is passed to step 308. If the defect is considered as an analysis-needed part, image data necessary to analyze the analysis-needed part (analysis data) is transferred from the analysis buffer memory 52 to the analysis memory in the ADC system 31. Transfer is achieved by utilizing a technique such as direct memory access (DMA). The processing performance of the computer will not deteriorate. When transfer of image data is completed, control is passed to step 308. It is judged whether all dice are checked to detect a defect, sample an analysis-needed part, and transfer data. The foregoing procedure is repeated until all the dice are checked, that is, the last die is scanned. According to this embodiment, the ADC system 31 has an analysis memory having a sufficient storage capacity. The above procedure is carried out irrespective of the processing performed by the ADC system 31. Concurrently with the processing, the results of automatic defect classification are sent from the ADC system 31. The results are received and stored in the memory.

When initial analysis data is sent, the ADC system 31 passes control from step 321 at which analysis data is awaited to step 322 at which automatic detect classification is carried out. The results of classification are sent to the sampling and control unit 53. The procedure is repeated until all analysis data items are checked to classify defects.

The results of defect classification are sent from the ADC system 31 to the sampling and control unit 53. The results of defect classification are displayed sequentially on the display 41 together with the location and size of a defective part specified in defect information. Otherwise, all the results are displayed thereon when they are gathered. For analyzing a trend of defects, the categories of defects may be grasped statistically.

As mentioned above, according to this embodiment, defect detection and automatic defect classification are carried out concurrently in the course of inspecting the appearance of a semiconductor wafer. The processing time required for automatic defect classification can therefore be extended. Moreover, automatic defect classification is completed for a short time since the completion of defect detection.

Moreover, depending on a manufacturing process, defects belonging to a specified category alone may be or may not be desired to be treated as an object of defect classification.

According to this embodiment, it is possible to specify categories into which defects are classified automatically, and to thus improve the efficiency in appearance inspection. A difference in color, size, or brightness, that is, gray-scale level between a defective part and normal part is often characteristic of each category of defects. Image data may be read by designating a difference in color or gray-scale level of a defect that is an object of automatic defect classification. Image data of a defective part is then read and judged. Thus, image data of a defective part that is an object of automatic defect classification can be read efficiently. Data of a defective part and data of an adjacent normal part, which should be sent to the ADC system, can be limited.

For example, if a defect derives from a short-circuited metallic line, the defective part appears white and exhibits a large difference in gray-scale level. If a defect derives from particles, the defective part appears black. These characteristics may be utilized. Namely, a control unit 21, judges a category to which a defect belongs from such a characteristic. If the defect derives from a short-circuited line, image data of the defect may not be sent to the ADC system. By contrast, the image data may be sent as a top priority.

Next, a description will be made of storage and transfer of image data involving the image comparison circuit 51, analysis buffer memory 52, sampling and control unit 53, and ADC system 31 employed in this embodiment.

Figure 7:
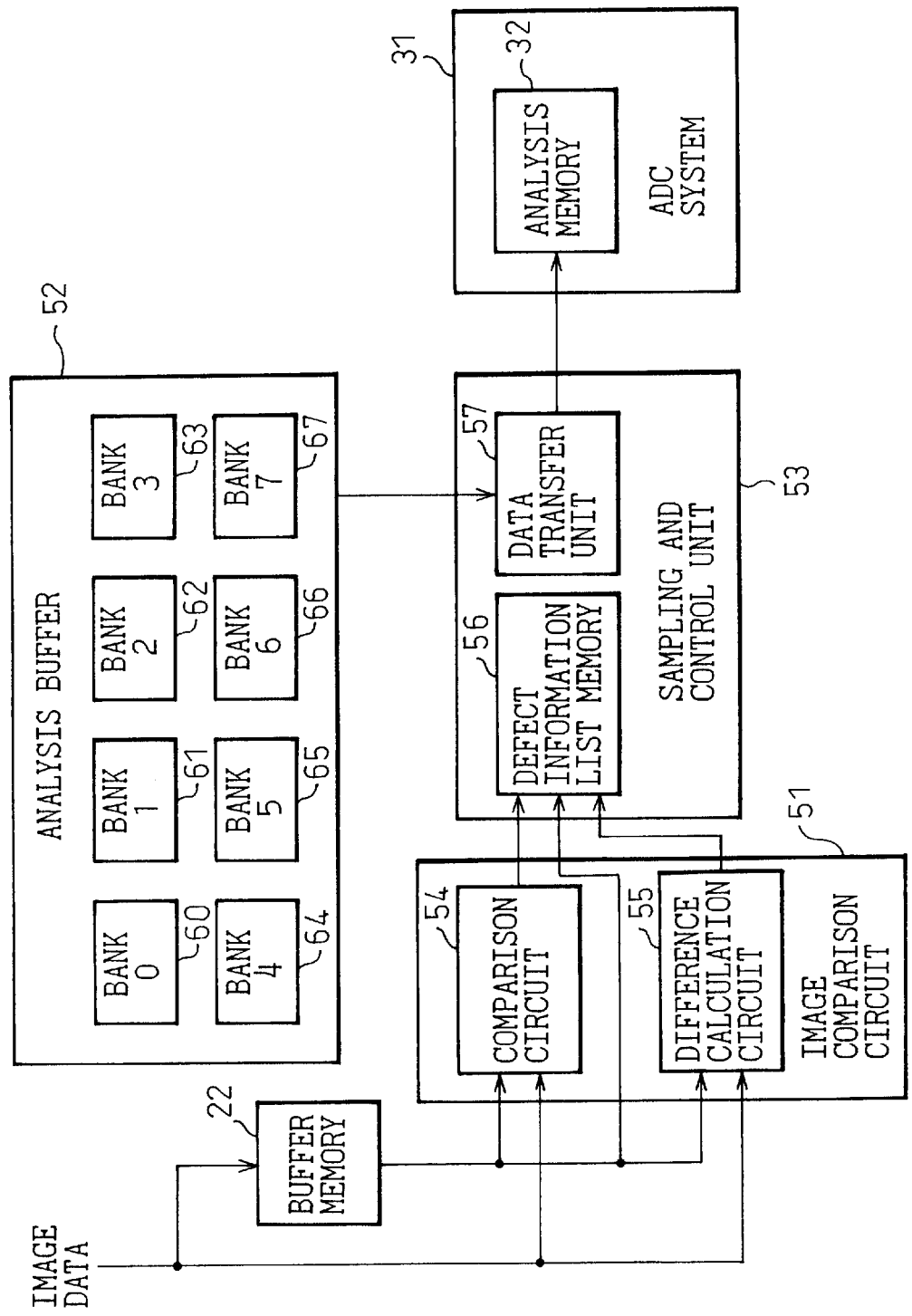
FIG. 7 shows the configuration of a unit relating to storage and processing of image data according to the embodiment of the present invention.

AS shown in FIG. 7, the image comparison circuit 51 includes a comparison circuit 54 and a difference calculation circuit 55. The comparison circuit 54 outputs data indicating a defect when image data is different from image data output from the comparison buffer memory 22 by a set value or more. The difference calculation circuit 55 calculates a difference in gray-scale level between these two image data items. An output of the comparison circuit 54, image data output from the comparison buffer memory 22, and an output of the difference calculation circuit 55 are provided as defect information. When the comparison circuit 54 outputs data indicating a defect, the defect information is stored in a defect information list storage unit 56 included in the sampling and control unit 53. Incidentally, an address signal indicating the location of image data is also input to the defect information list storage unit 56, and stored therein when the output of the comparison circuit 54 is data indicating a defect. The sampling and control unit 53 selects a pattern whose defect may highly possibly be significant from defect information stored in the defect information list storage unit 56. A priority order is assigned to the pattern in terms of the necessity of defect classification. A group of defects whose locations are mutually close is detected, and the size of an area occupied by the group of defects is checked to judge the size of a defect.

The analysis buffer memory 52 is composed of, for example, eight banks 60 to 67 ranging from bank 0 to bank 7. Each bank has the same storage capacity as the comparison buffer memory 22. Image data acquired by one scan is stored in each bank. Image data is supplied to the analysis buffer memory 52 and written and stored in a selected bank. Moreover, image data of a desired area may be read from a selected bank, and transferred to the analysis memory 32 in the ADC system 31 via a data transfer unit 57 in the sampling and control unit 53. The analysis buffer memory 52 is realized with, for example, a multi-port memory. writing data in any selected bank can be carried out concurrently with reading of data therefrom.

Figure 8:
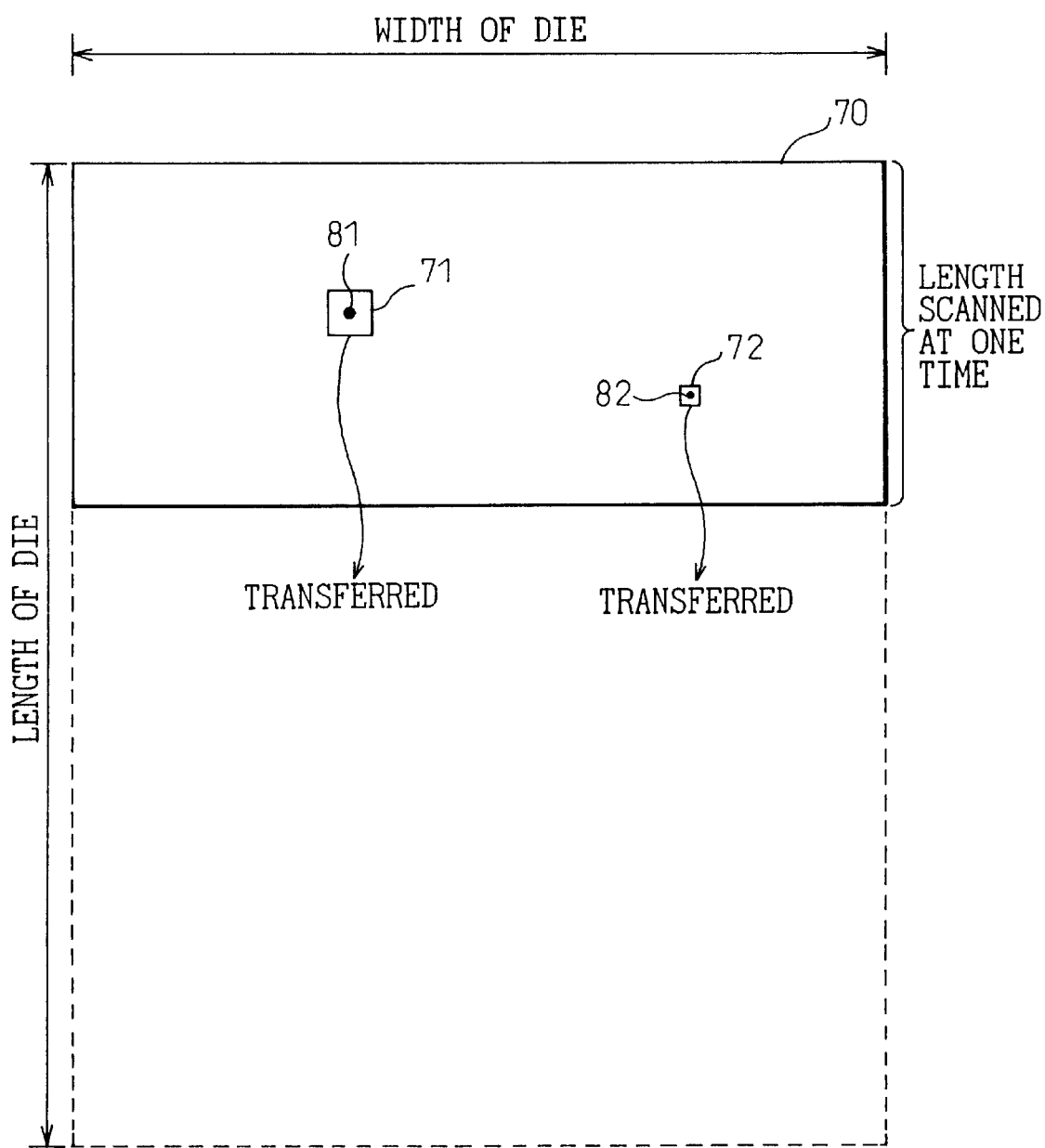
FIG. 8 shows the relationship between an area whose image data is transferred to an ADC system and an area whose image is acquired by scanning one die sideways using a TDI sensor whose width equals to a length to be scanned once.

FIG. 8 shows the relationship between an area 70 and a part whose image data is sampled and transferred. Herein, the area 70 is an area whose image data is stored in each bank. In other words, the area 70 is an area whose image data is fetched when one die is scanned sideways by a TDI sensor whose width equals a length to be scanned at a time. As illustrated, as far as a large defect 81 is concerned, image data of a wide area 71 is transferred. For a small defect 82, image data of a narrow area 72 is transferred. In either case, an area whose image data is transferred is small relative to the whole. Image data items of analysis-needed parts of a plurality of dice are stored simultaneously in the analysis memory 32 in the ADC system 31. Nevertheless, the storage capacity of the analysis memory 32 need not be very large.

Figure 9:
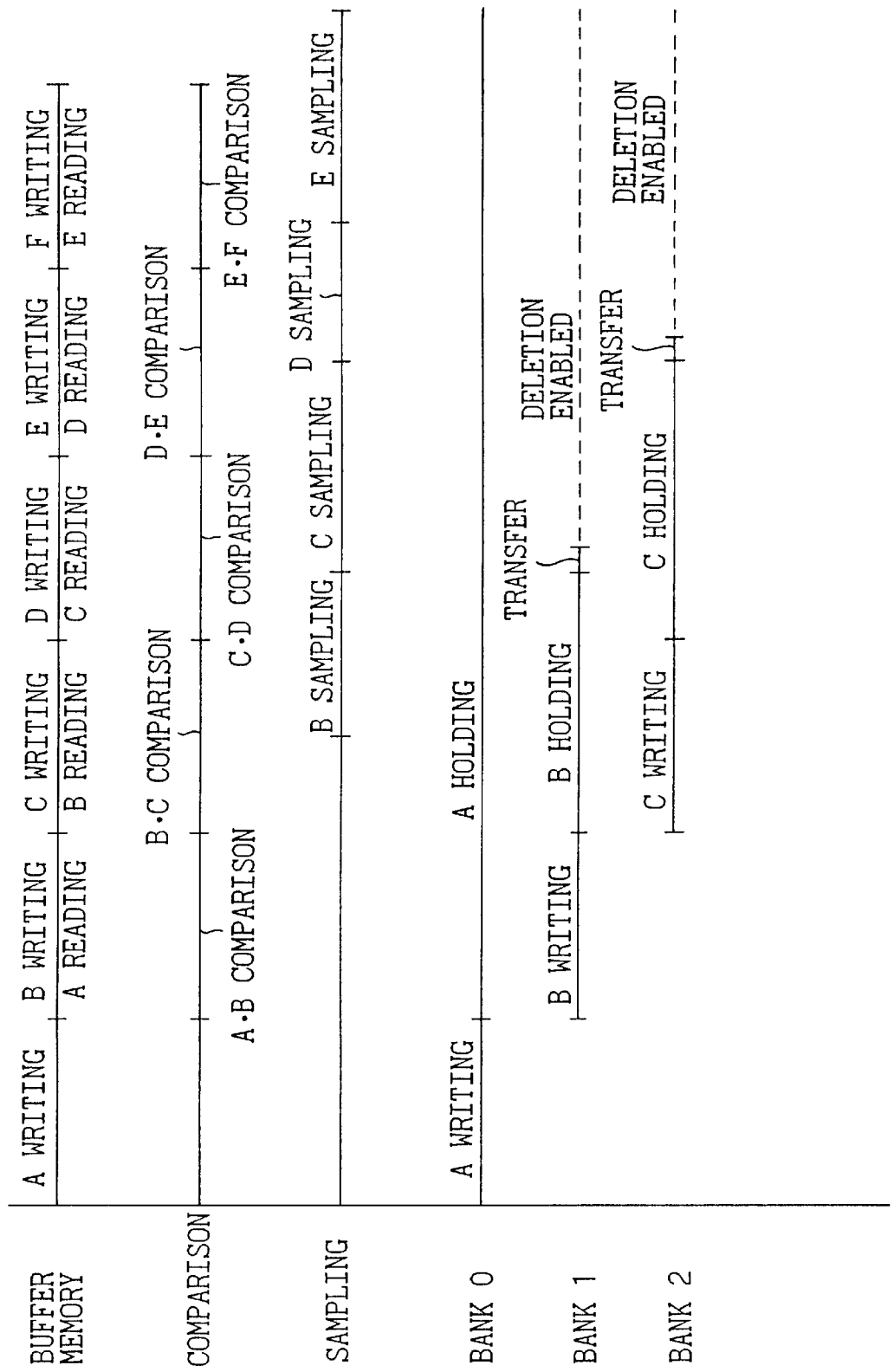
FIG. 9 is a timing chart indicating the relationship between processing and holding of image data by each unit in the embodiment of the present invention.

FIG. 9 is a timing chart indicating the flow of image data to be stored in or processed by the comparison buffer memory 22, the image comparison circuit 51, the sampling and control unit 53, and each bank of the analysis buffer 52. FIG. 9 involves only three banks. Moreover, image data of a normal part to be transferred together with image data of an analysis-needed part is not illustrated. For example, when image data of an analysis-needed part of die B is transferred, image data of a counterpart of die C is transferred concurrently. Image data of an analysis-needed part of die C is transferred together with image data of a counterpart of die D.

As illustrated, when the second comparison of each die is started, defect information is output successively. The defect information of each die is then sampled. When the second comparison of each die is completed, the defect information of each die is output. Thereafter, sampling is completed within a certain time interval. An analysis-needed part of each die is determined and the information of the analysis-needed part is transferred. When the transfer is completed, the image information of the die becomes unnecessary. Image data of another die can be stored in a bank in which the image data of the die is stored.

Now, a description will be made of the reason why the image data of die A is stored and held in bank 0. Namely, the first die A is subjected to single detection, that is, compared only once with die B. It will not take place that die A is compared for the second time. The image data of die A must be held in bank 0 until the second comparison of die A is carried out at a proper time, for example, at the completion of scanning of dies lined on the uppermost side. If sampling is carried out as indicated in FIG. 9, four banks are needed. If sampling is carried out for a very short time interval, sampling may be completed during the transition between dies. In this case, only three banks are needed. Moreover, after the last die undergoes single detection, die A may be scanned again and compared for the second time with the last die. In this case, the image data of die A need not be held. The number of banks therefore decreases by one.

By contrast, the time required for sampling may be uncertain or may be longer than the time required to scan one die sideways. The number of necessary banks increases by one. In this embodiment, the number of banks included should be equal to the largest number of dice lined on one row. This leads to the simple control sequence.

Figure 10:
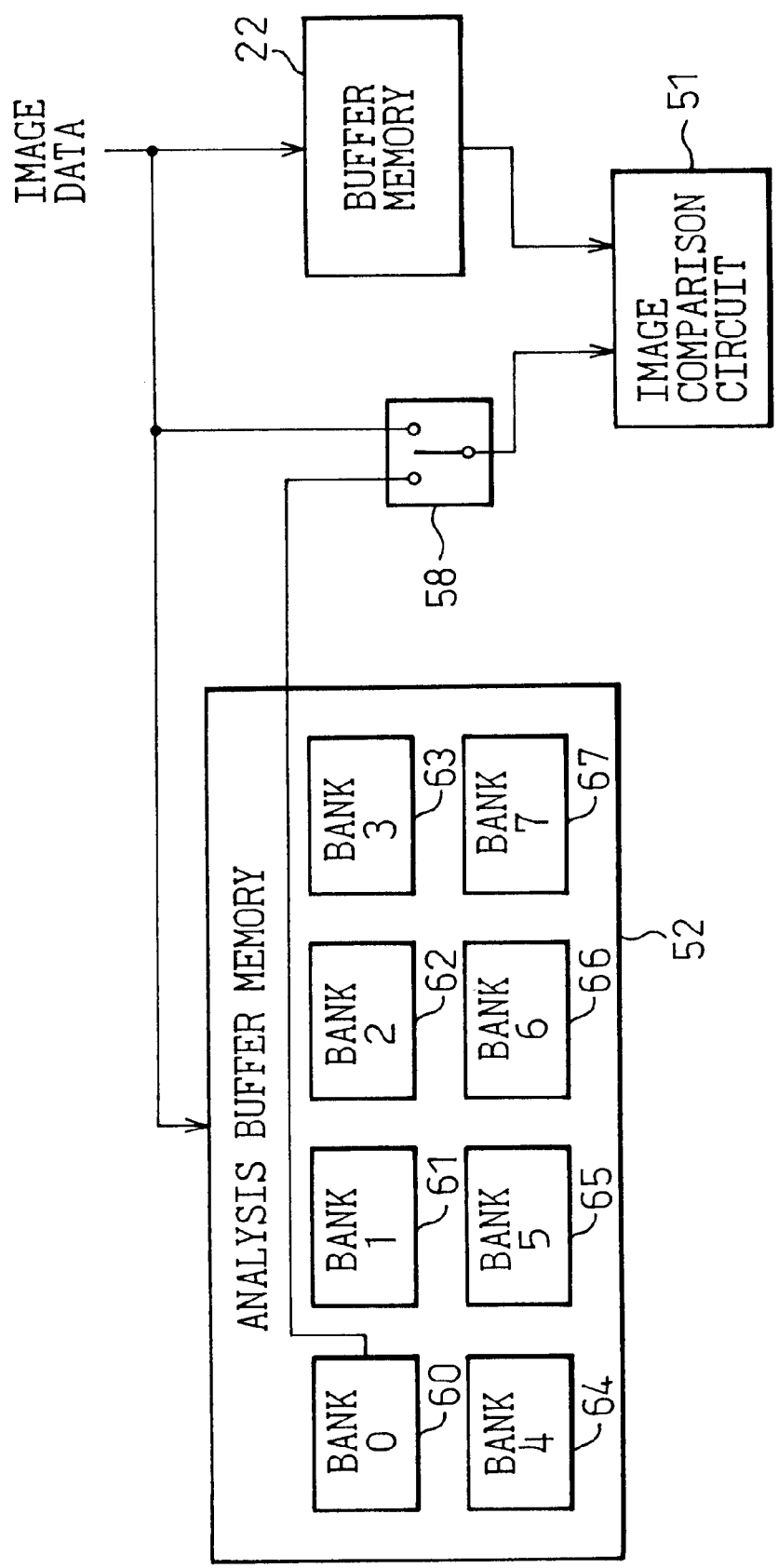
FIG. 10 shows the configuration for comparing the first die with another for the second time according to the embodiment of the present invention.

Next, a description will be made of the configuration for carrying out the second comparison of the first die A in the course of processing. FIG. 10 shows the configuration. As illustrated, a switch 58 is included so that data to be input to the image comparison circuit 51 can be changed from image data to data read from bank 0 or vice versa. FIG. 11 is a timing chart indicating the flow of data. As illustrated, after comparison of die B with die C is completed, scanning is suspended. The switch 58 is changed over to the analysis buffer so that an output read from bank 0, in which image data of die A is stored, will be input to the image comparison circuit 51. Moreover, writing image data in the comparison buffer memory 22 is suspended. Image data of die C is read from the comparison buffer 22. Die A is compared for the second time with die C by the image comparison circuit 51. At this time, die C is compared for the second time. Image data of die C held in the comparison buffer memory 22 is used to be compared with that of die D.

The question of whether the first die is compared with another for the second time also accompanies the last die. In the foregoing example, image data of the third last die that remains intact in any bank of the analysis buffer 52 may be used to compare the third die with another.

As apparent from the above description, the banks of the comparison buffer memory 22 and those of the analysis buffer 52 are mutually identical. The comparison buffer memory 22 may be excluded. The banks of the analysis buffer memory 52 may be used to compare one image with another. FIG. 12 shows the configuration for using the banks of the analysis buffer memory to compare one image with another. FIG. 13 is a timing chart indicating the flow of image data.

As shown in FIG. 12, image data read from a selected bank of the analysis buffer memory 52 can be input to the image comparison circuit 51 through one of the input terminals thereof. A switch 59 is included for selecting either image data or image data read from a selected bank of the analysis buffer memory 52 as data to be input to the image comparison circuit 51 through the other input terminal thereof. The image comparison circuit 51 can compare the image data with the image data read from any selected bank. The comparison buffer memory 22 can therefore be excluded. Furthermore, the second comparison of the first die A or the second comparison of the last die can be carried out without the necessity of fetching image data again.

As described so far, according to the present invention, automatic defect classification included in appearance inspection can be achieved efficiently. The time required for the whole appearance inspection can be shortened, the throughput of inspection can be improved, and defect analysis can be achieved satisfactorily in a short time interval.

What is claimed is:

1. An appearance inspection machine comprising an image acquisition unit for sequentially acquiring image data of each die by scanning a semiconductor wafer that has a plurality of dice formed thereon; a defect information production unit for comparing the acquired image data with image data of a counterpart of another die so as to detect a defect, and sequentially producing defect information; and an automatic defect classification unit for autonomously classifying a defect according to image data of at least part of the detected defect, wherein said defect information production unit includes:
a comparison buffer memory for temporarily storing the image data;
an image comparison unit for comparing the image data with the image data of a counterpart stored in said comparison buffer memory so as to detect a defect;
an analysis buffer memory for temporarily storing the image data; and
a sampling and control unit for selecting an analysis-needed part, whose defect is automatically classified by said automatic defect classification unit, according to the sequentially produced defect information, and transferring image data necessary to analyze the analysis-needed part to said automatic defect classification unit,
wherein as soon as the defect information is produced, said sampling and control unit selects an analysis-needed part and transfers image data;
said automatic defect classification unit sequentially classifies the transferred image data; and
defect detection by said defect information production unit and classification by said automatic defect classification unit are partly carried out concurrently.

2. An appearance inspection machine according to claim 1, wherein after transfer of the image data is completed, new image data is sequentially stored in said analysis buffer memory.

3. An appearance inspection machine according to claim 1, wherein said image comparison unit outputs the location and size of a defective part, the gray-scale level thereof, and a difference in gray-scale level thereof from a compared part as the defect information.

4. An appearance inspection machine according to claim 1, wherein said sampling and control unit transfers image data of an area covering the analysis-needed part and its surroundings, and image data of a counterpart of an adjacent normal die.

5. An appearance inspection machine according to claim 4, wherein said sampling and control unit varies the size of the area, whose image data is transferred, depending on the size of the analysis-needed part.

6. An appearance inspection machine according to claim 1, wherein said image comparison unit detects a defect according to double detection according to which: image data of one die is compared with those of other adjacent dice twice; and when the results of two comparisons are mutually different, the die is judged to be defective.

7. An appearance inspection machine according to claim 1, wherein said analysis buffer memory has a storage capacity that is large enough to store image data acquired by scanning a row, on which the largest number of dice is aligned, once.

8. An appearance inspection machine according to claim 1, wherein image data read from at least part of said analysis buffer memory can be supplied to the image comparison unit.

9. An appearance inspection machine according to claim 1, wherein image data read from said analysis buffer memory can be supplied to said image comparison unit, and said analysis buffer memory is used as said comparison buffer memory.

10. An appearance inspection machine according to claim 1, wherein said analysis buffer memory has a plurality of banks in each of which image data acquired by scanning one die once is stored, and data can be written or read in or from the banks concurrently.

11. An appearance inspection machine according to claim 1, wherein said image acquisition unit includes an optical microscope and a TDI sensor.

12. An appearance inspection method comprising an image acquisition step of sequentially acquiring image data of each die by scanning a semiconductor wafer that has a plurality of dice formed thereon; a defect information production step of detecting a defect by comparing the acquired image data with image data of a counterpart of another die, and sequentially producing defect information; and an automatic defect classification step of automatically classifying a defect according to image data of a defective part covering at least part of the detected defect, wherein said defect information production step includes:
a comparison data storage step of temporarily storing the acquired image data as comparison image data;

an image comparison step of detecting a defect by comparing the image data with a counterpart of the comparison image data;

an analysis data storage step of temporarily storing the acquired image data as analysis image data; and a sampling and control step of sampling an analysis-needed part, of which defect is automatically classified at said automatic defect classification step, according to the sequentially produced defect information, and transferring image data, which is necessary to analyze the analysis-needed part, to an automatic defect classification memory, and wherein at said sampling and control step, as soon as the defect information is produced, an analysis-needed part is sampled and image data is transferred;

at said automatic defect classification step, the transferred image data is classified sequentially; and defect detection at said defect information production step and classification at said automatic defect classification step are partly carried out concurrently.

13. An appearance inspection method according to claim 12, wherein at said analysis data storage step, after transfer of the image data is completed, new image data is stored sequentially.

14. An appearance inspection method according to claim 12, wherein at said image comparison step, the location and size of a defective part, a gray-scale level thereof, and a difference in gray-scale level thereof from a compared part are output as the defect information.

15. An appearance inspection method according to claim 12, wherein at said sampling and control step, image data of an area covering the analysis-needed part and its surroundings is transferred together with image data of a counterpart of an adjacent normal die.

16. An appearance inspection method according to claim 15, wherein at said sampling and control step, the size of the area whose image data is transferred is varied depending on the size of the analysis-needed part.

17. An appearance inspection method according to claim 12, wherein at said image comparison step, a defect is detected according to double detection according to which: image data of one die is compared with image data of other adjacent dice twice; and when the results of two comparisons are mutually different, the die is judged to be defective.

18. An appearance inspection method according to claim 12, wherein said analysis buffer memory has a storage capacity that is large enough to store image data acquired by scanning a row, on which the largest number of dice is aligned, once.

* * * * *